W. H. HARRISON.
DISSECTED MAPS.
No. 180,476. Patented Aug. 1, 1876.
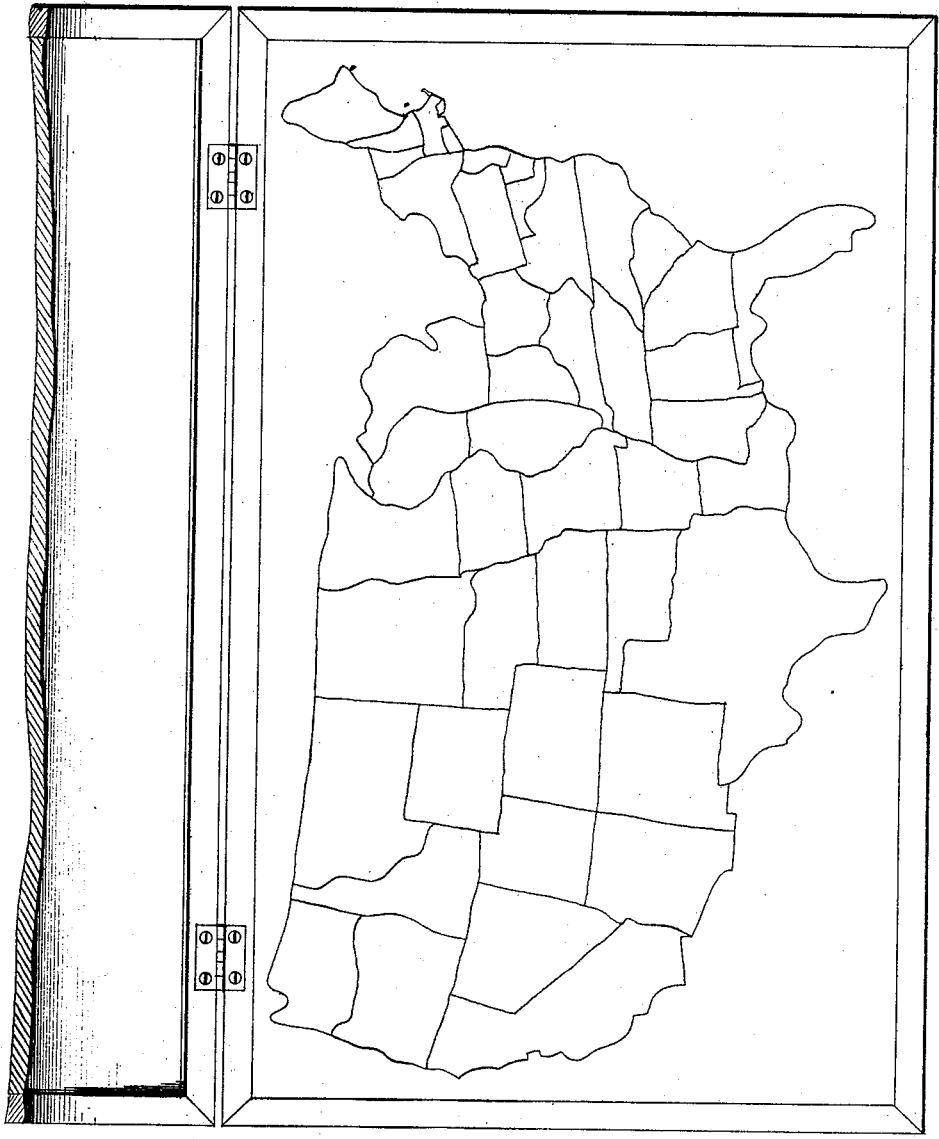
Attest:
B. F. Moore
T. Murray
Inventor:
William H. Harrison

UNITED STATES PATENT OFFICE.

WILLIAM H. HARRISON, OF DARBY TOWNSHIP, DELAWARE COUNTY, PA.

IMPROVEMENT IN DISSECTED MAPS.

Specification forming part of Letters Patent No. 180,476, dated August 1, 1876; application filed May 1, 1876.

*To all whom it may concern:*

Be it known that I, WILLIAM H. HARRISON, of Darby township, Delaware county, Pennsylvania, have invented a Dissected Map, of which the following is a specification:

My invention consists of a geographical representation by means of blocks having a slated surface and plain—i. e., without names or other pointed marks upon it—each block representing, in relative size and outline or shape, one of the natural or political divisions of the earth, and adapted to fit together like an ordinary puzzle or dissected map. The blocks are so made as to fit in a wooden book-like case or frame, the limits of each block forming the boundary of the state or division represented by it.

In use these blocks are taken from the case, and the map reconstructed by replacing block after block, there being scarcely a limit to the different points from which to commence building. The map being completed the slated surface is used, and the different geographical features of each block are indicated thereon by means of pencil or crayon.

I claim as my invention—

A dissected geographical map or puzzle, each piece or block whereof has the form in line of a political or natural subdivision of the earth, and is provided upon one of its faces with a plain slated surface, substantially as and for the purpose described.

WILLIAM H. HARRISON.

Witnesses:
B. F. MOORE,
T. MURRAY.